US008388348B2

(12) United States Patent
Biltz et al.

(10) Patent No.: US 8,388,348 B2
(45) Date of Patent: Mar. 5, 2013

(54) DISEASE TREATMENT SIMULATION

(75) Inventors: George R. Biltz, St. Paul, MN (US);
Pradyumna Dutta, Sleepy Hollow, NY (US); Paul E. Johnson, Minnetonka, MN (US); Patrick J. O'Connor, St. Paul, MN (US); William A. Rush, Edina, MN (US); JoAnn M. Sperl-Hillen, Minnetonka, MN (US)

(73) Assignees: Regents of the University of Minnesota, St. Paul, MN (US);
HealthPartners Research Foundation, Bloomington, MN (US)

( * ) Notice: Subject to any disclaimer, the term of this patent is extended or adjusted under 35 U.S.C. 154(b) by 1131 days.

(21) Appl. No.: 11/607,435

(22) Filed: Dec. 1, 2006

(65) Prior Publication Data
US 2007/0148625 A1    Jun. 28, 2007

Related U.S. Application Data

(63) Continuation-in-part of application No. 11/379,351, filed on Apr. 19, 2006, now abandoned.

(51) Int. Cl.
*G09B 23/28* (2006.01)
(52) U.S. Cl. ....................................................... 434/262
(58) Field of Classification Search .......... 434/262–275; 128/922–925; 600/300–301; 705/2–4; 703/11, 703/6; 706/45
See application file for complete search history.

(56) References Cited

U.S. PATENT DOCUMENTS

| 6,692,258 | B1 * | 2/2004  | Kurzweil et al. ............. 434/262 |
| 6,747,672 | B1   | 6/2004  | Haakonsen et al. |
| 6,978,244 | B2   | 12/2005 | Rovinelli et al. |
| 7,937,254 | B2 * | 5/2011  | Brown ............................... 703/6 |
| 2006/0292535 | A1 | 12/2006 | O'Connor et al. |
| 2008/0167917 | A1 * | 7/2008 | Clayton et al. .................... 705/7 |

OTHER PUBLICATIONS

"U.S. Appl. No. 11/379,351, Non-Final Office Action mailed Feb. 5, 2008", 6 pgs.
"U.S. Appl. No. 11/379,351, Preliminary Amendment mailed Sep. 5, 2006", 3 pgs.
"MedCases Home Page", [online]. (c) 2004, MedCases, Inc. [archived Apr. 2, 2005]. Retrieved from the Internet: <URL: http://web.archive.org/web/20050402073615/http://www.medcases.com/>.
Dutta, P., et al., "SimCare: A Model for Studying Physician Decisionmaking Activity", Advances in Patient Safety: From Research to Implementation, vol. 4, (AHRQ Publication No. May 0021-4), (Feb. 2005), 179-192.

* cited by examiner

*Primary Examiner* — Timothy A Musselman
(74) *Attorney, Agent, or Firm* — Schwegman, Lundberg & Woessner, P.A.

(57) ABSTRACT

There are provided a method, system and medium having instructions embedded to determine an attribute of a simulated patient's state resulting from a patient-physician encounter. The method includes receiving a current treatment move and an initial value of the attribute; calculating a maximal expected incremental effect value of the current treatment move over a previous treatment move on the attribute; attenuating the maximal expected incremental effect value based on amount of time between the previous treatment move and the current treatment move; summing the attenuated maximal expected incremental effect value with the initial value to generate an updated attribute of the simulated patient's state; and generating a patient-physician encounter that includes the updated attribute.

23 Claims, 8 Drawing Sheets

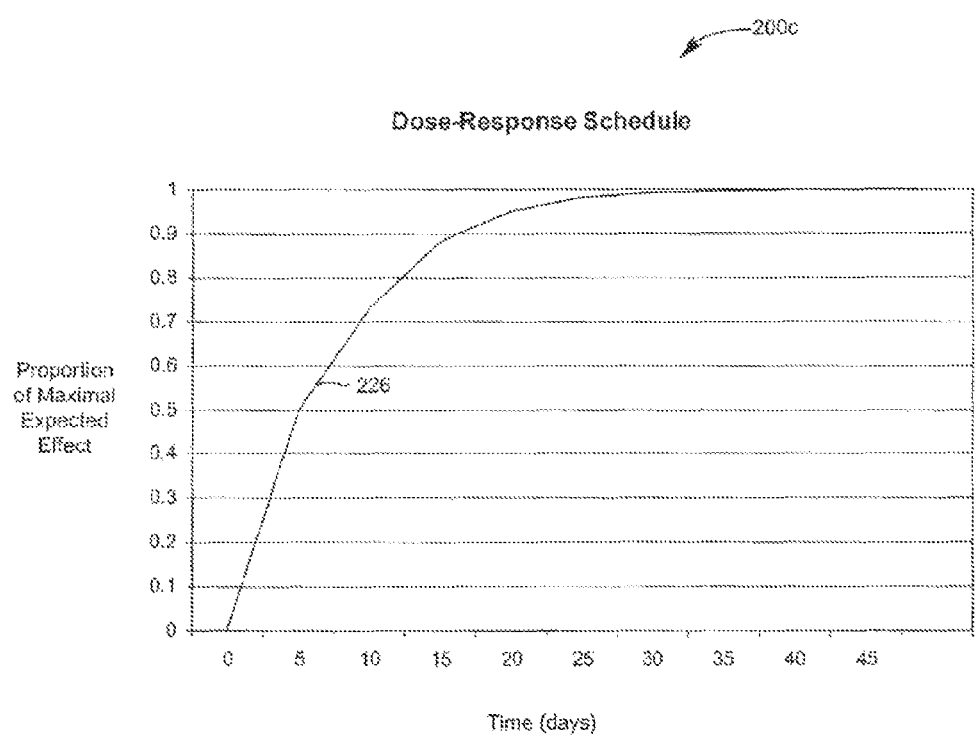

DISEASE TREATMENT SIMULATION

CROSS REFERENCE TO RELATED APPLICATIONS

This application is a continuation in part of U.S. application Ser. No. 11/379,351, entitled Disease Treatment Simulation and filed on Apr. 19, 2006 now abandoned, the contents of which are incorporated herein by reference.

TECHNICAL FIELD

The present application relates generally to disease treatment simulation. More specifically, example embodiments are directed to a method, system, and a medium having instructions embedded, to determine an attribute of a simulated patient's state resulting from a patient-physician encounter.

BACKGROUND

The clinical course of chronic illnesses such as diabetes mellitus type 2 (i.e., "type 2 DM") is generally characterized by slowly changing states of health, with inherent variability in the rate of disease progression across patients. The detection of significant change in health status of individual patients may be masked by the subtle progression of the disease and its complications, and of common comorbid conditions. Physicians often fail to prescribe appropriate evidence-based treatment in patients who have not achieved recommended clinical goals for a variety of reasons. There are several confounding variables that affect patients' response to treatment. For example, changes in socioeconomic status or health insurance coverage may alter patterns of care or medication adherence.

The cognitive challenges to physicians caring for those with a complex chronic disease such as diabetes are many. Some of the major cognitive tasks include: selecting appropriate evidence-based clinical goals across multiple clinical domains (for example, glucose, blood pressure, cholesterol); initiating appropriate therapy; titrating therapy to achieve and maintain desired evidence-based goals; and detecting and effectively managing comorbid conditions, such as depression, that may interfere with diabetes treatment.

Computer-based models and simulation methods have been used to better understand and improve diabetes care. Diabetes Physiolab® is a proprietary system that models disease at the level of enzymatic activity. Other efforts have modeled general diabetes physiology, pharmacokinetics, specific glucose-insulin interactions as educational simulators, as well as diabetes decision-support systems. The Global Diabetes Model, a stochastic model of type 2 DM, has been developed to predict trends for diabetic individuals or populations. A recent model—Archimedes—has simulated a continuous disease process at the individual patient level. Other case-based learning efforts exist that are used for physician continuing education.

However, existing models do not provide dynamic feedback or learning where the long-term effect of previous physician moves can be represented. They also do not provide a focus on the clinical physician-patient encounter, which is the basis for the study and improvement of physician decision-making.

SUMMARY

In accordance with an embodiment, there is provided a method to determine an attribute of a simulated patient's state resulting from a patient-physician encounter, the method including: receiving a current treatment move and an initial value of the attribute; calculating a maximal expected incremental effect value of the current treatment move over a previous treatment move on the attribute; attenuating the maximal expected incremental effect value based on amount of time between the previous treatment move and the current treatment move; summing the attenuated maximal expected incremental effect value with the initial value to generate an updated attribute of the simulated patient's state; and generating a patient-physician encounter that includes the updated attribute.

In accordance with another embodiment, there is provided a system to determine an attribute of a simulated patient's state resulting from a patient-physician physician encounter, the system including: a user interface adapted to receive a current treatment move; an encounter state loader adapted to load an initial value of the attribute; an integrator adapted to calculate a maximal expected incremental effect value of the current treatment move over a previous treatment move on the attribute; a time attenuator adapted to attenuate the maximal expected incremental effect value based on amount of time between the previous treatment move and the current treatment move; a finalizer adapted to sum the attenuated maximal expected incremental effect value with the initial value to generate an updated attribute value of the simulated patient's state; and an updater adapted to generate a patient-physician encounter that includes the updated attribute value.

In accordance with yet another embodiment there is provided a machine accessible medium having instructions embedded thereon, the instructions when accessed by a machine perform a method to determine an attribute of a simulated patient's state resulting from a patient-physician encounter, the method including: receiving a current treatment move and an initial value of the attribute; calculating a maximal expected incremental effect value of the current treatment move over a previous treatment move on the attribute; attenuating the maximal expected incremental effect value based on amount of time between the previous treatment move and the current treatment move; summing the attenuated maximal expected incremental effect value with the initial value to generate an updated attribute value of the simulated patient's state; and generating a patient-physician encounter that includes the updated attribute value.

BRIEF DESCRIPTION OF THE DRAWINGS

The present disclosure will become better understood with reference to the following description and accompanying drawings, wherein:

FIG. 2C is an example dose-response schedule illustrating a transform or conversion function adapted to calculate a proportion of the maximal expected effect for the particular drug calculated in accordance with FIG. 2B depending upon the time elapsed since a treatment move was made;

DETAILED DESCRIPTION

In general, there is provided a dynamic, interactive simulation and projection for the treatment of patients with type 2 diabetes mellitus (i.e., "type 2 DM"). One or more patient cases may be presented in sequence. Each patient case is managed through a series of virtual or simulated patient-physician encounters in a primary care clinical setting. The physician is able to perform the traditional subjective-objective-assessment plan (SOAP) approach to patient care. This format helps establish clinical plausibility and provides a framework for presenting data and accepting physician treatment moves. Hereinafter, each treatment action made by a physician via the simulation environment will be referred to as a "treatment move" or "move."

The simulation is an abstraction of the type 2 DM clinical setting, created for purposes of capturing physician treatment moves. The goal of the simulation is to engage physician decision making and solicit representative treatment moves. Given this focus on the clinical patient-physician encounter, the simulation does not incorporate a complete model of diabetic pathophysiology.

The simulation of a patient-physician encounter begins with the physician selecting a simulated patient case from a library of cases. The simulated patient case is presented in the form of a patient case history, with an initial patient state, i.e., initial patient data for the simulated patient case. The patient data are composed of a set of attributes (e.g., variables) that may change as a function of the physician treatment moves to be made by the physician. The patient-physician encounter progresses through a cycle including the presentation of the patient data, collection of one or more physician treatment moves, generation of updated patient data in response to the physician treatment moves, and projection of the updated patient data a predetermined period of time into the future. At the conclusion of the patient-physician encounter, the physician may schedule a subsequent visit for a next patient-physician encounter. The simulation responds by presenting the next patient-physician encounter with the updated patient state, reflecting updated patient data. The updated patient data is based on both the physician treatment moves and on the amount of time that has elapsed between patient-physician encounters. A unique disease trajectory, which depends on the specific treatment moves made by the physician and the elapsed time between patient-physician encounters, unfolds for each simulated patient.

Figure 1:
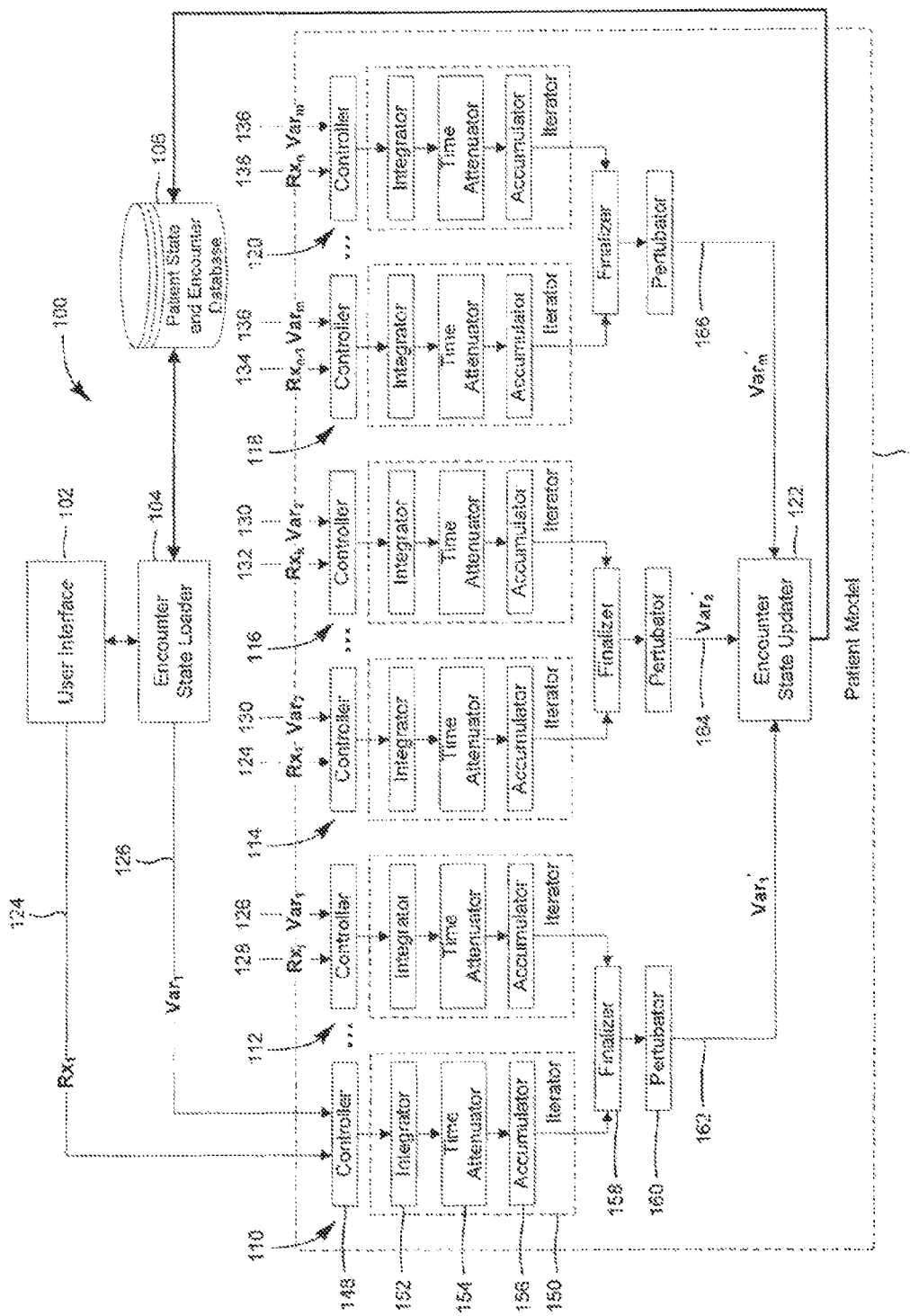
FIG. 1 is an example block diagram illustrating a simulation system 100 adapted to simulate a patient state resulting from one or more physician treatment moves over a set of one or more patient-physician clinical encounters.

FIG. 1 is an example block diagram illustrating a simulation system 100 adapted to simulate a patient state resulting from one or more physician treatment moves over a set of one or more patient-physician clinical encounters. The simulation system 100 includes a user interface (UI) 102, an encounter state loader 104, a patient state and encounter database 106 and a patient model 108. The UI 102 presents to a physician an interactive platform, including a plurality of screens, that enable the physician to interact with the simulation system 100. More specifically, the UI 102 presents patient data to the physician, transmits physician treatment moves to the patient model 108, and preserves the clinical environment of continuous care over the patient-physician encounters during which the physician treats the simulated patient. The UI 102 enables the physician to view patient data of the simulated patient, including a physical exam report, recent laboratory results, current prescriptions, and a simulated patient self-report. Explicit physiological data (e.g., blood pressure, glycated hemoglobin (HgbA1c), or a lipid panel) are provided in the physical exam report and laboratory results. Implicit behavioral data (e.g., diet, exercise) and psychosocial data (e.g., treatment adherence, depression) are provided through a patient self-report. The physician may change medications and/or doses thereof, give life style advice to the patient (e.g., increase/decrease/maintain exercise and prescribe high fiber/low calorie/low sodium diet), order laboratory tests, and make referrals to specialists (e.g., related to treatment adherence and depression). At the conclusion of each encounter, the UI 102 further provides the physician with the ability to schedule a subsequent patient-physician encounter for follow-up care.

Further with reference to FIG. 1, the encounter state loader 104 is communicatively connected to the patient state and encounter database 106, the UI 102 and the patient model 108. More specifically, the UI 102 via input from a physician being trained may request the encounter state loader 104 to load a particular patient case from the patient state and encounter database 106. The patient case consists of a case history, medical chart data, current prescription, patient self-report, physical exam report, etc. An example case history may be: "Bill is a depressed 60-year-old white male (retired computer programmer) with previous diagnosis of type 2 diabetes over 10 years ago. He is obese, has coronary heart disease and is in poor diabetes control. He does not feel well educated in diabetic self-care, is on a high-fat diet and has a sedentary lifestyle with no exercise. He has an 80-pack year smoking history, and severe emphysema, but quit smoking five years ago. His wife is sick but devoted. He does not recall if and when he had either eye or foot exams. Recent HgbA1c not recalled."

The request may be made by the UI 102 upon the physician selecting a particular simulated patient for treatment. The encounter state loader 104 reads the patient state for the selected simulated patient from the patient state and encounter database 106 and stores the patient state in variables into memory (not shown). More specifically, the patient state is composed of plural attributes and the values of these attributes are retrieved from the patient state and encounter database 106 and stored into variables in memory. For example, the patient state may include variables $Var_1 \ldots Var_m$ having defined values for the simulated patient. Any number of attributes may be defined and loaded into associated variables for a given simulated patient state. For example, $Var_1$ may represent the simulated patient's glycated hemoglobin (HgbA1c), $Var_2$ may represent the patient's systolic (or diastolic) blood pressure, $Var_3$ may represent the patient's LDL, $Var_4$ may represent the patient's HDL, $Var_5$ may represent triglycerides level, $Var_6$ may represent the patient's serum creatinine level, $Var_7$ may represent the patient's weight, $Var_8$ may represent the patient's depression level, $Var_9$ may represent the patient's dietary level, $Var_{10}$ may represent the patient's exercise level, $Var_{11}$ may represent the patient's treatment adherence level, etcetera. It is noted that any number of attributes may be defined, which may be loaded into associated variables by the simulation system 100. Each variable includes a value associated with the particular type of variable as provided in greater detail below. The patient state (loaded into a plurality of variables) is displayed to the physician being trained via the UI 102, using the aforementioned physical exam report, recent laboratory results, and a simulated patient self-report. The patient state is also provided by the encounter state loader 104 to the patient model 108 as will be described below.

Still further with reference to presenting a patient state for the simulated patient in FIG. 1, the simulated patient may have presented with a patient state that includes higher than normal HgbA1c, higher than normal LDL and/or lower than normal HDL, high systolic and/or diastolic blood pressure, and being overweight and/or depressed. Based on this presentation, the associated variables $Var_1 \ldots Var_m$ represent the patient state of the simulated patient that was selected by the physician for the patient-physician encounter. For example, $Var_1$ which may represent HgbA1c may be set to value such as 8, representing 8% of total hemoglobin and corresponding to approximately 180 mg/dl average blood glucose level, which is higher than a normal range of 4.4%-6.1% that corresponds to average blood glucose levels of approximately 60 mg/dl to approximately 120 mg/dl. As another example, $Var_2$ which may represent systolic (or diastolic) blood pressure may be set to a value such 180 (representing 180 mmHg), which is higher than normal of approximately 120 for systolic blood pressure. Similarly, the other variables listed above may also be loaded with values representing the patient state of the simulated patient. While not all the variables would be presented outside their normal range, they would together constitute the presented case which would require one or more treatment moves by the physician. Cases are constructed by expert physicians to represent typical cases that are seen in practice. That is, these values are predetermined to represent the patient state for the simulated patient at the time of the patient-physician encounter.

Yet further with reference to FIG. 1, the physician being trained may make one or more treatment moves via the UI 102 for a particular patient-physician encounter. More particularly, the physician may prescribe a particular medication and dosage thereof, order lab tests, view charts for past test results, may make a referral to a specialist (social worker, ophthalmologist, cardiologist, endocrinologist, podiatrist, psychologist, diabetes educator, or dietitian), may give life style advice, such as to increase/decrease/maintain an exercise level and prescribe a diet of some or all of high fiber, low calorie, and low sodium, and schedule a follow-up visit. The particular treatment moves may be selected from one or more screens presented to the physician. For example, based on the presented patient state, represented by the aforementioned physical exam, laboratory results, and patient self report, the physician may select one or more listed medications and dosages for each medication, may make a referral to a psychologist for adherence and/or depression problems, and may also recommend a level of exercise and a diet regimen along with a referral to a dietitian. The physician may schedule a follow-up visit after a period of three weeks.

Further with reference to FIG. 1, the patient state and encounter database 106 stores patient states of one or more simulated patients for each patient-physician encounter. The database 106 may consist of and relates the following tables as well as additional tables: 1) Patient—each record contains static data for a patient (key: patientID). Data such as patient name, sex, case history are stored here; 2) Encounter—Each record contains data for an encounter (key: patientID). A patient can have multiple records in this table. Data such as diet and exercise levels, blood pressure, weight, encounter date, etc., that are specific to each encounter are stored here; 3) Lab Orders—each record contains a record of the lab orders for a given encounter. There is one record for each encounter listing all the lab orders made for that encounter; 4) Lab Results—each record contains results of lab tests for an encounter. This table includes medical charting data such as LDL, HDL, HgbA1c, Triglycerides, Creatinine; 5) Prescriptions—each record contains the list of prescriptions for one encounter. Holds the record of medication orders by medication name, dosage, and dose frequency, e.g., Glipizide, 5 mg, b.i.d. (taken twice a day); 6) Process Trace—this table contains a time-stamped record of each move made by the physician subject such that the record of their actions can be retrieved later. Other ancillary tables exist in addition to the ones described above, for purposes including storing intermediate values, model relationships, temporary variables, graphing functions and system logs.

As can be seen above, the patient state of a simulated patient, which is comprised of a plurality of attributes described above, is stored for each patient-physician encounter in the foregoing tables. For an initial patient-physician encounter, in which the physician selects a patient for treatment, the database 106 includes only one encounter record, and the values of the attributes of this encounter record are preset or predetermined to present the simulated patient in a particular physical state for physician training. Upon each patient-physician encounter, an encounter record is added to the patient state and encounter database 106 with attributes that represent the patient state, the attributes being calculated by the simulation system 100 based on the particular treatment moves performed or advised by the physician being trained during the patient-physician encounter, as will be described in greater detail below.

Additionally with reference to FIG. 1, the patient model 108 includes functional blocks 110 through 120. A set of one or more blocks produces an updated or calculated value of a particular attribute or variable associated with the patient state of a particular simulated patient. More specifically, the patient model 108 illustrates example treatment moves $Rx_1$ to $Rx_n$, as well as which particular variables $Var_1$ to $Var_m$ those treatment moves affect. For example, treatment moves $Rx_1 \ldots Rx_j$ (124, 128) affect variable $Var_1$ 126, treatment moves $Rx_1 \ldots Rx_k$ (124, 132) affect variable $Var_2$ (130) and treatment moves $Rx_{n-1} \ldots Rx_n$ (134, 138) affect variable $Var_m$. As illustrated in the example patient model 108, an example first set of treatment moves $Rx_1 \ldots Rx_j$ may affect variable $Var_1$. An example second set of treatment moves $Rx_1 \ldots Rx_k$ may affect a different variable $Var_2$. It is noted that the first set and second set may have overlapping treatment moves that affect different variables. An example third set of treatment moves $Rx_{n-1} \ldots RX_n$ may affect a variable $Rx_m$. It is noted that the third set of treatment moves has no overlapping treatment moves with the first and second treatment moves. For example, the drug Simvastatin may be $Rx_1$ that affects both HDL ($Var_1$) and LDL ($Var_2$). In addition, the drug Gemfibrozil ($Rx_j$) may affect only HDL ($Var_1$) but not LDL ($Var_2$).

Still further with reference to FIG. 1, during a patient-physician encounter, the physician may make one or more treatment moves, by selecting one or more particular medications and dosages thereof, advising on life style changes by modifying diet and exercise regimens, as well as referring the simulated patient to other professionals (e.g., psychologist). The foregoing may be provided as selections in different screens of the simulation system 100. In the patient model 108, each treatment move is associated with a respective Rx, and each respective treatment move (Rx) may be associated with one or more attributes of the patient state (Var) which it may affect. The relationship between a particular treatment move and the associated variable that the treatment move affects is stored in rules which compute the effect of a drug over time. These rules are based on data used of the Dose Response Tables, described in greater detail below with reference to FIG. 2B. The attenuation of the treatment move's effect on the variable over time is represented in Dose-Response Schedule, described in greater detail below with reference to FIG. 2C. The attribute (Var) affected by a current treatment move is a value loaded from the patient and encounter database 106 and the value represents the attribute determined as a result of one or more previous treatment move during a previous patient-physician encounter, if any, or the value is a predetermined value that represents the patient state for the simulated patient being treated by the physician, if no previous treatment moves (e.g., no previous patient-physician encounters). For example, although each example functional block 110 and 112 receives a different treatment move $Rx_1$ 124 and $Rx_j$ 128, respectively, each functional block 110 and 112 produces a respective change to the value of $Var_1$ 126 from the previous patient-physician encounter. Similarly, example functional blocks 114 and 116 receive different treatment moves $Rx_1$ 124 and $Rx_k$ 132, respectively, and produce respective changes to the value of $Var_2$ 130, while example functional blocks 118 and 120 receive different treatment moves $Rx_{n-1}$ 134 and $Rx_n$ 128, respectively, and produce respective changes to the value of $Var_m$ 136. It should be noted that different treatment moves (Rx) may produce effects or changes to the value of the same attribute (Var) for the patient state of the simulated patient being treated by the training physician. It should further be noted that the same treatment move (Rx) may affect multiple attributes (Var) for the patient state of the simulated patient being treated by the training physician.

Yet further with reference to FIG. 1, the functional blocks 110-120 are generally similar with certain exceptions, as will be described below. An example functional block 110 will be described in detail to illustrate how a value of a particular attribute (represented by $Var_1$ 126) is updated based on the treatments moves $Rx_1$ 124 and $Rx_j$ 128 and made by the physician during a patient-physician encounter for a simulated patient in the simulation system 100. Specifically with reference to functional block 110, functional block 110 includes a controller 148, and an iterator 150, which includes an integrator 152, a time attenuator 154 and an accumulator 156. The controller 148 first receives the current treatment move $Rx_1$ 124 from the UI 102, which is entered by the physician during the current patient-encounter. The controller further requests from the encounter state loader 104 the value of variable $Var_1$ 126 that is associated with and to be affected by the current treatment move. The encounter state loader 104 transmits the value of $Var_1$ 126 to the controller 148. Since $Var_1$ 126 has been loaded at instantiation of simulation system 100 with the value of an attribute from a previous patient-physician encounter representing the current patient state of the simulated patient, the encounter state loader 104 may not need to query the database 106 for this value. Alternatively, the value of this attribute may of course be loaded from the patient state and encounter database 106, as needed. The current treatment move $Rx_1$ 124 and the variable $Var_1$ 126 are transmitted to the integrator 152.

Still further with reference to FIG. 1, the controller 128 further controls the iterator 150 to iterate through all previous patient-physician encounters (in the patient state and encounter database 106) for the simulated patient to calculate an incremental effect or change in the value of $Var_1$ 126 resulting from the treatment move $Rx_1$, the iteration is described below in reference to FIG. 5. The controller 148 may accomplish the iteration by using the dates of patient-physician encounters. More specifically, the date of the current patient-physician encounter (current encounter) may used to retrieve from the patient state and encounter database 106 a value of each treatment move Rx that affects an attribute that is associated to $Var_1$ for the next most recent patient-physician encounter, then the next most recent patient-physician encounter, and so on, until the first encounter is reached, and then the next entry being an initial state of the simulated patient, which may be termed encounter "zero." The values of the treatment moves $Rx_1$ 124 for the different successive encounters may be retrieved by the controller 148 in successive reads of the patient state and encounter database 106, or instead the controller 148 may read the patient state and encounter database 106 once and may transmit each successive value of the attribute for each successive patient-physician encounter in turn to the integrator 152. The number of successive encounters, excluding the zero encounter (initial state of simulated patient), represents the number of iterations performed by the integrator 152, time attenuator 154 and accumulator 156 of iterator 150.

In addition with reference to FIG. 1, the controller 148 further transmits iteratively each of the retrieved values of the attribute for each successive encounter to the integrator 152. In the initial encounter when there are no previous encounters, the iteration through previous encounters does not occur as there are no previous encounters. Using the values received, including the value of $Var_1$ 126 and any values of successive attributes retrieved from database 106, the integrator 152 integrates the various values and computes a projected value for the attribute (Var 126) for the next encounter. The projected value is based by computing the maximal expected incremental effect of the treatment move Rx 124 for the current patient-physician encounter on the attribute ($Var_1$ 126). The computation of the maximal expected incremental effect will be described with greater particularity in reference to FIG. 2B. At this point it is sufficient to point out that the integrator 152 may also convert a particular treatment move for the current patient-physician encounter into an incremental effect value associated with the particular attribute of the patient state (e.g., $Var_1$ 126), as particularly described in reference to FIG. 2A below. For example, if the treatment move is a dosage of a particular medication affecting $Var_1$, that dosage of the medication is converted into an incremental effect value ($\Delta Var_1$) associated with $Var_1$ as will be described in greater detail with reference to FIGS. 2A and 2B below. The mechanism described here is a general form that applies to the effects of all treatment moves that affect patient attributes, including referrals, and diet & exercise recommendations. The effects of these kinds of treatment moves are specified with a look-up table for the maximal expected effect of the move (for example, starting a patient on a low sodium diet has a maximal expected benefit of reducing blood pressure by 10 mmHg). The integrator 152 simply applies a lookup table for the effects of diet, exercise and referrals while the effects of medications are computed as will be described in FIGS. 2A and 2B.

Further with reference to FIG. 1, the maximal expected incremental effect computed by the integrator 152 is transmitted to the time attenuator 154, which computes a proportion of the maximal expected incremental effect based on the time that has elapsed between the treatment move of the current patient-physician encounter and the previous patient-physician encounter. The maximal expected incremental effect is then multiplied by the proportion to obtain the time attenuated maximal expected incremental effect. The computation of the proportion of the effect due to time elapsed (time attenuation) will be described in greater detail with reference to FIG. 2C. It should be noted that time attenuation for all treatment moves from previous encounters is computed up to the current encounter. In other words, if there are five treatment moves with the fifth treatment move being the current move, the time attenuation for the moves one through four is calculated from the date of each treatment move to the current encounter. The time attenuated maximal expected incremental effect of the treatment move for the current patient-physician encounter over the related value of the attribute from the previous patient-physician encounter is accumulated by the accumulator 156, which sums the proportionate changes in attribute values between each pair of successive patient-physician encounters. The accumulator 156 transmits the summation of the different proportionate changes to the finalizer 158, which sums the proportionate changes in attribute values with the value of $Var_1$ 126, which represents the maximal expected effect of the treatment move for the current patient-physician encounter on the associated attribute. The maximal expected effect of the current treatment move is transmitted from the finalizer 158 to the pertubator 160, which perturbates or adjusts the maximal expected effect of the current treatment move by determining and adding a random perturbation value within a predetermined range for the particular type of attributes to the maximal expected effect. The pertubated value represents an updated variable $Var_1'$ 162 of $Var_1$ 126.

Lastly with reference to FIG. 1, the range of the random pertubation value may be preset to vary within a certain range. For example, systolic blood pressure (e.g., $Var_2$) may be pertubated randomly between −2 and +3. LDL (e.g., $Var_3$) may be pertubated randomly between −1 and +2. HDL (e.g., $Var_4$) may be pertubated between −3 and +2. Triglycerides (e.g., $Var_5$) may be pertubated between −6 and +7. Weight (e.g., $Var_7$) may be pertubated between −1 and +1. It is noted that while certain attributes may pertubated other attributes, such as HgbA1c (e.g., $Var_1$) and creatinine (e.g., $Var_6$), may or may not be pertubated, as may predetermined by the simulation system 100. As HbgA1c is a slowly changing value which does not vary much and due to its natural range of perturbation or measurement error being low, it is may not pertubated. It is noted that the foregoing different variables (Var) may be inputs to other functional blocks 112-120 in the simulation system 100 of FIG. 1. The pertubated value ($Var_1'$) 162 is transmitted from the pertubator 160 to the encounter state updater 122, which updates the patient state and encounter database 106 with a current patient-physician encounter that includes the pertubated value ($Var_1'$) 162 as well as the treatment move 124. The treatment move (Rx) is saved for each encounter as its effect on an attribute could persist over multiple encounters. It is noted that the other treatment moves/variables are processed similarly via functional blocks 112-120, and the pertubated values $Var_2'$ 164 and $Var_m'$ 166 are likewise written to the database 106 for the current patient-physician encounter, updating the patient state of the simulated patient in accordance with one or more treatment moves by the physician treating the simulated patient.

Figure 2A:
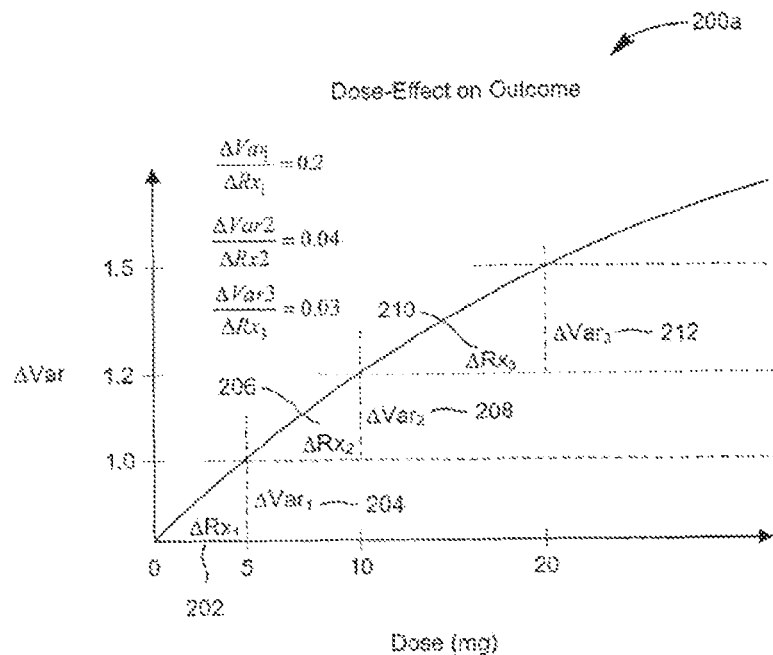
FIG. 2A is an example dose-effect on outcome graph illustrating a transform or conversion function adapted to transform a dose-response table for a predetermined drug to incremental changes in effect for given dosages of the drug.

FIG. 2A is an example dose-effect on outcome graph 200a illustrating a transform or conversion function adapted to transform a dose-response table for a predetermined drug to incremental changes in effect for given dosages of the drug. Each drug company or manufacturer that produces a drug provides a dose-response table that describes the effect of different common dosages of the drug (e.g., Glipizide) on a particular attribute, such as for example attribute HgbA1c ($Var_1$) 126 illustrated in graph 200a. It is noted that different dose-effect graphs are provided for different drugs that affect particular attributes, such as HgbA1c. For non-drug moves such as referrals and lifestyle recommendations (diet and exercise) the dose effect on outcome is obtained from a look-up table. This is due to the non-drug moves not having a magnitude but rather simply being present or not (either made a referral or not, either gave diet advice or not). Correspondingly, the maximal effect is constant and therefore easily implemented with a look-up table. For drug treatment moves, the increase in the dosage of a drug may not be proportional to the increase in the associated attribute for the simulated patient. Furthermore, the manufacturer's dose-response table may not have an intermediate dosage that may be prescribed as a result of treatment move. In addition, a drug may be added as well as removed from a patient's prescription. Thus, transform or conversion function of FIG. 2A allows the computation of the effect of adding or removing a drug, at non-standard dose levels, with non-linear relationships between the drug dose and its effect. The effects of the treatment move must be represented to dynamically model the effects as observed in clinical studies, reported in medical guidelines, and expressed by physician experts.

Further with reference to FIG. 2A, the dose-effect graph 200a represents a transformation of an example dose-response table (e.g., Glipizide) to incremental changes in effect for the given dosages of the drug, which facilitates proper computation of the maximal expected effect for various dosages that may not have been provided in dose-response table, as will be described in FIG. 2B. For example, 5 mg of Glipizide is expected to produce a decrease in HgbA1c of 1.0; 10 mg is expected to produce a decrease of 1.2; and 20 mg is expected to produce a decrease of 1.5. The slope of the effect is computed as follows: $\Delta Var_1$ 204=(1 HgbA1c−0 HgbA1c) divided by $\Delta Rx_1$ 202 (5 mg−0 mg)=0.2. This represents that a change from 0 mg to 5 mg (or from 5 mg to 0 mg) of Glipizde results in a decrease in HgbA1c of 0.2. The effect is bi-directional in that a change in dose from 5 mg to 0 mg would result in an increase of HgbA1c of 0.2. Similarly, the second slope $\Delta Var_2$ 208 is computed as follows: (1.2 HgbA1c−1 HgbA1c) divided by $\Delta Rx_2$ 206 (10 mg−5 mg)=0.04. Similarly, the third slope $\Delta Var_3$ 212 is computed as follows: (1.5 HgbA1c−1.2 HgbA1c) divided by $\Delta Rx_3$210 (20 mg−10 mg)=0.03. These slopes are used to compute bi-directional, incremental changes between any two doses, ranging between zero and the maximum dose.

Figure 2B:
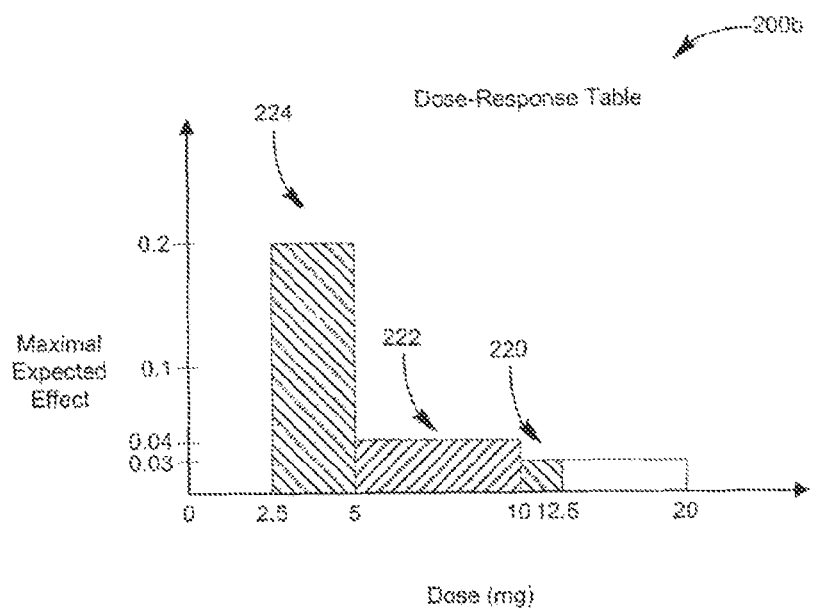
FIG. 2B is an example dose-response table illustrating a maximal expected effect of a given dosage for the particular drug on a particular attribute in accordance with the incremental changes calculated in FIG. 2A.

FIG. 2B is an example dose-response table 200b illustrating a maximal expected effect of a given dosage for the particular drug on a particular attribute in accordance with the incremental changes calculated in FIG. 2A. For example, the dose-response table 200b illustrates a maximal expected effect on HgbA1c of 12.5 mg of Glipizide with a starting dose of 2.5 mg. The y-axis in the graph in FIG. 2B is the slope computed in FIG. 2.A. The x-axis shows the doses from 0 to the maximum dose, which in this example is 20 mg. The area under the curve represents the total incremental effect of a move (dose change). The incremental effect is computed by measuring the area under the curve as the drug dose moves from the start dose to the end dose. In the current example the shaded area shows the effect of changing the start dose of 2.5 mg to the end dose of 12.5 mg. The area is integrated by first computing the area from the start dose (2.5 mg) to the first dose level (5 mg) 224, which in our example is (5−2.5)*0.2=0.5, and then the area for all intermediate dose level 222 which is (10−5)*0.04=0.2, and then from the final dose level to the new dose 220, which is (12.5−10)*0.03=0.075. Consequently, the maximum expected effect of the treatment move 220, a dosage change from 2.5 mg to 12.5 mg of Glipizide, is the sum of all the incremental changes (e.g., areas) equal to 0.5+0.2+0.075=0.775. Therefore, the maximal effect on HgbA1c from the treatment move, in this case, is a decrease of 0.775.

Further with reference to FIG. 2B, the above may be implemented as a function, which computes the maximal expected effect of a treatment move on a particular attribute as follows:

$$\Delta Attr_{Drug} = Sgn(m_0 - m_1) *$$
$$\sum_{i=0} \alpha_i * \max(\min(Dose_{i+1}, \max(m_0, m_1)) - \max(Dose_i, \min(m_0, m_1)), 0);$$

where $m_0$=current drug dose, $m_1$=last drug dose, and
Sgn(x)=−1 if x is negative, 1 if x is positive, and 0 if x=0, and
$\alpha_i$=slope of dose level.

The summation above adds the area under each dose level as was computed in the above example. The min and max functions simply pick the end points of each dose for the x-axis length of each rectangle, and the $\alpha_i$ is the y-axis as shown in FIG. 2B. Each section is added to provide the total area under the curve going from the initial dose to the final dose. The maximal effect of the treatment move computed is reflected on the attribute immediately but is reflected gradually over time (time attenuated). The time attenuation of the maximal effect is computed using a dose-response schedule of FIG. 2C below.

FIG. 2C is an example dose-response schedule 200c illustrating a transform or conversion function adapted to calculate a proportion of the maximal expected effect for the particular drug calculated in accordance with FIG. 2B depending upon the time elapsed since a treatment move was made. In schedule 200c there is illustrated an exponential function to calculate the proportion of the maximal expected effect of a drug (e.g., Glipizide) attenuated by the passage of time. Each treatment move (Rx) using a particular drug in the simulation system 100 has an associated dose-response graph 200c given by an exponential function that specifies the proportion of the treatment move's effect that depends on the time elapsed since that treatment move was made. Some treatment moves reach their peak effect in a few days, while other treatment moves can take several weeks or longer before the entire effect is manifest. In the graph 200c, the proportion of the maximal effect of the example drug Glipizide is given by exponential curve 226. As particularly illustrated in graph 200c, by day 5, the proportion of the maximal expected effect for the particular drug (e.g., Glipizide) is expected to be 50%, by day 15 about 90%, and by day 30 about 100%. The general form of the transform or conversion function that approximates the proportion of the maximal expected effect for the particular drug as a result of time attenuation is given by the following formula:

$$t_n = \alpha * \left(1 + e^{\frac{-T}{\beta}}\right)^{-1},$$

where n is n is the number of days till peak effect, T is actual time elapsed, and $\alpha$ and $\beta$ are coefficients that determine the desired shape of the curve. The shape of the curve, as embodied in the coefficients $\alpha$ and $\beta$, determines how quickly the drug takes effect on the attribute. The following functions are used for drugs that reach peak effect in 14 days and 90 days, respectively:

$$t_{14} = 2 * \left(1 + e^{\frac{-T}{2}}\right)^{-1} \text{ and } t_{90} = 2 * \left(1 + e^{\frac{-T}{16}}\right)^{-1}$$

As the portion of a curve is computed from one encounter to the next, the actual computation is $t_{14}$=2*((1/(1+Exp(−TInterval/2)))−((1/(1+Exp(−(MLastVisitDate−currDate)/2))))), where TInterval=goalDate−currDate, goalDate is the new date for which the attribute is being computed, currDate is date of the encounter of the move and MLastVisitDate is the date of the last encounter. $t_{14}$ is a factor between 0 and 1 and it is multiplied to the maximal dose effect computed in FIG. 2A to compute the incremental effect of the treatment move.

Figure 3:
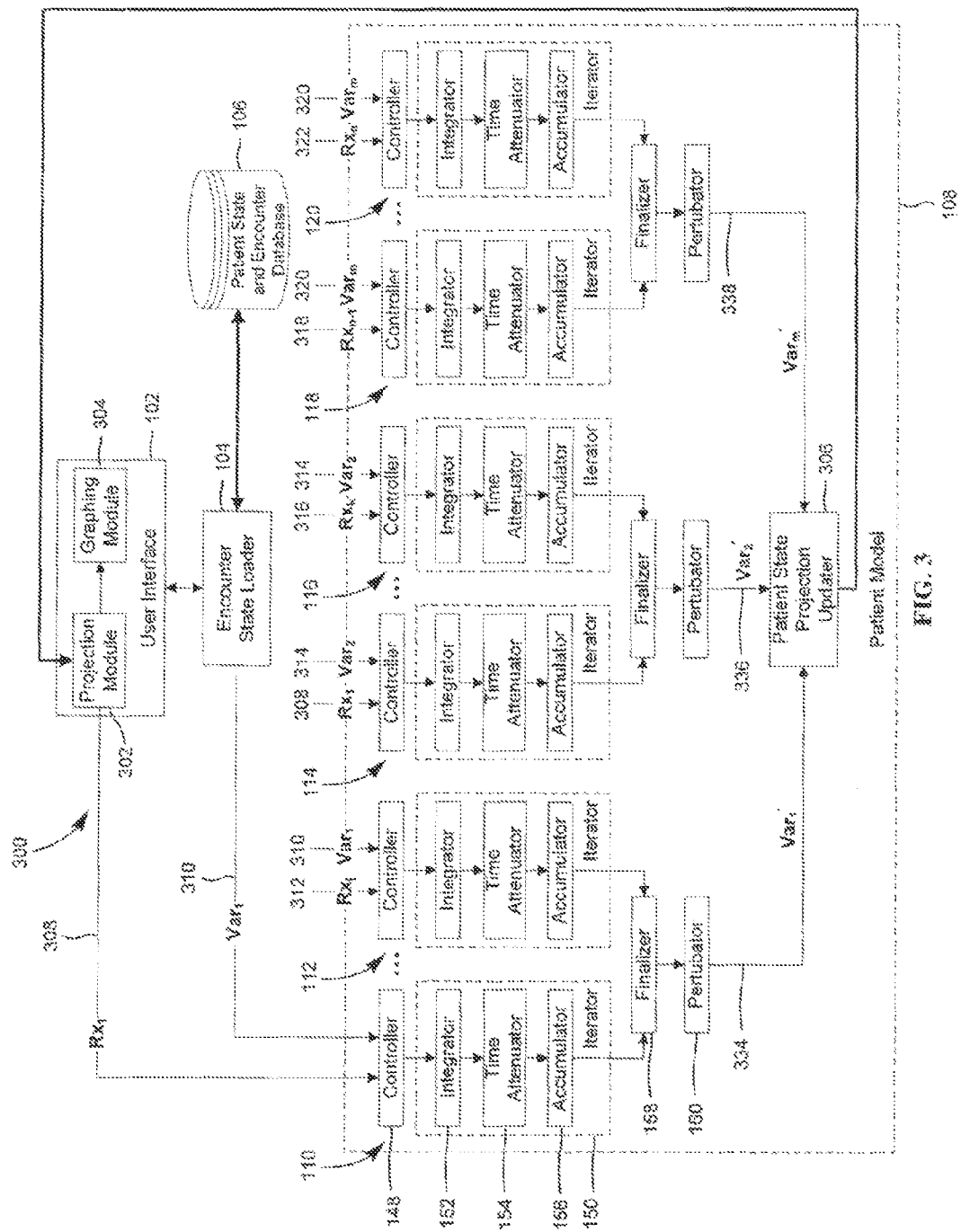
FIG. 3 is an example block diagram illustrating a simulation system adapted to project an attribute or multiple attributes of the simulated patient state over multiple future encounters.

FIG. 3 is an example block diagram illustrating a simulation system 300 adapted to project an attribute or multiple attributes of the simulated patient state over multiple future encounters. This is done to create "what if" scenarios of treatment moves made in a given encounter. The projection iterates through simulation 300 in a similar fashion to system 100 over a period of time without any further moves to demonstrate the effects of the current moves. More specifically, at the end of a current patient-physician encounter described in accordance with FIG. 1, simulation system 300 may project an attribute, such as HgbA1c (e.g., $Var_1$), that resulted from one or more treatment moves during a current patient-physician encounter for a predetermined period of time out into the future from the current patient-physician encounter. The UI 102 of the simulation system 300 includes a projection module 302 that controls projection of the attribute of the simulate patient's state for a predetermined time period and a graphing module 304 that displays the projection on a display device. The attribute or attributes to be projected may be predetermined or may be selectively provided via the UI 102 by the physician being trained. It is noted that any of the other attributes (e.g., systolic blood pressure, HDL, LDL, and the like) may likewise be projected. Furthermore, multiple attributes may be projected contemporaneously. The predetermined period may be selected from 30 days, 60 days, 90 days, 180 days, and the like, as may particularly be desired. Other time predetermined periods may be provided. The predetermined period may be coded into the projection module 302 of the UI 102 or may be selectively provided via the UI 102 by the physician being trained to the projection module 302.

Further with reference to FIG. 3, the projection proceeds in the same was as the same simulation shown in FIG. 1 except that the projection module 302 keeps simulating the passage of time one day at a time without any changes to the treatment moves. The attribute(s) of patient state gets updated one day at a time and the result is displayed. The updated value $Var_1'$ 334 is transmitted to the patient state projection updater 306, which in transmits $Var_1'$ 334 to the projection module 302. The projection module 302 in turn transmits $Var_1'$ 334 to the graphing module 304 that plots that the value of $Var_1'$ 334 for display to the physician being trained. System 300 processes newly advanced treatment moves 308 via blocks 148-160 and computes an updated value $Var_1'$ 334, which is transmitted to the projection module 302 and then to graphing module 304 to be plotted. Other attributes of the patient state $Var_2$ 314 and $Var_m$ 320 resulting from one or more treatment moves during a particular patient-physician encounter may be calculated and projected in a similar fashion to $Var_1$ 310, as may be preferred or required in the simulation system 300. The projection module 302 generates new treatment moves for projection based the projection period of time (e.g., 30, 60, 90, or 180 days, and the like).

Figure 4:
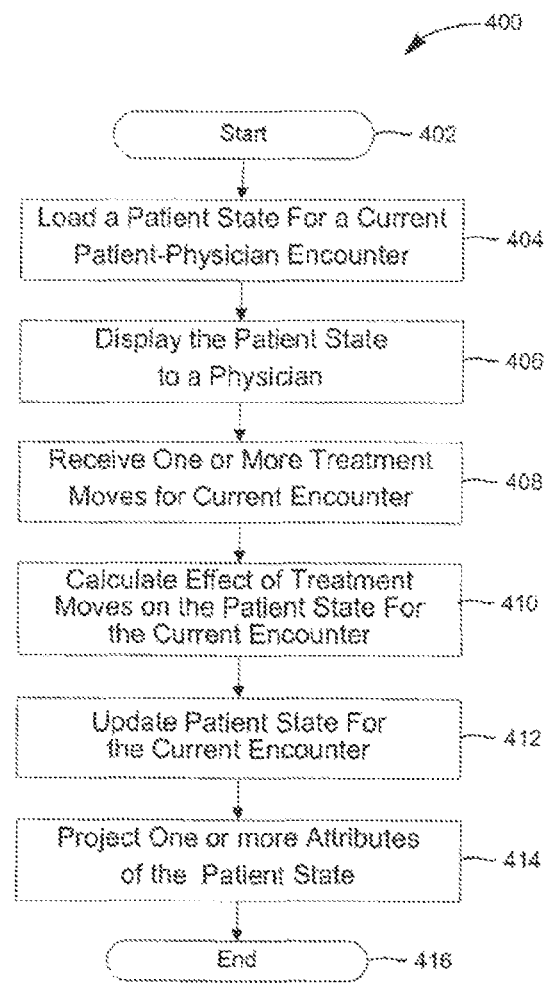
FIG. 4 is a flowchart illustrating an example method to simulate a patient state using resulting from one or more physician treatment moves during one particular patient-physician clinical encounter and to project an attribute of the simulated patient state into the future.

FIG. 4 is a flowchart illustrating an example method 400 to simulate a patient state using a simulation system resulting from one or more physician treatment moves during one particular patient-physician encounter and to project an attribute of the simulated patient state into the future. The method starts at operation 402. At operation 404, the patient state is displayed via a user interface to the physician being trained. One or more treatment moves are received by the simulation system from the physician, which may include particular medications and associated dosages (and the like) at operation 408. At operation 410, the effect of the physician treatment moves on attributes of the patient state is calculated. The attributes of the patient state are updated based on the calculations for the current encounter. The particular operations involved in calculating and updating the attributes will be described in reference to an example flowchart of FIG. 5 below. At the conclusion of the current encounter, one or more attributes of the patient state are projected for a predetermined time period into the future at operation 414. The flowchart 400 ends at operation 416.

Figure 5:
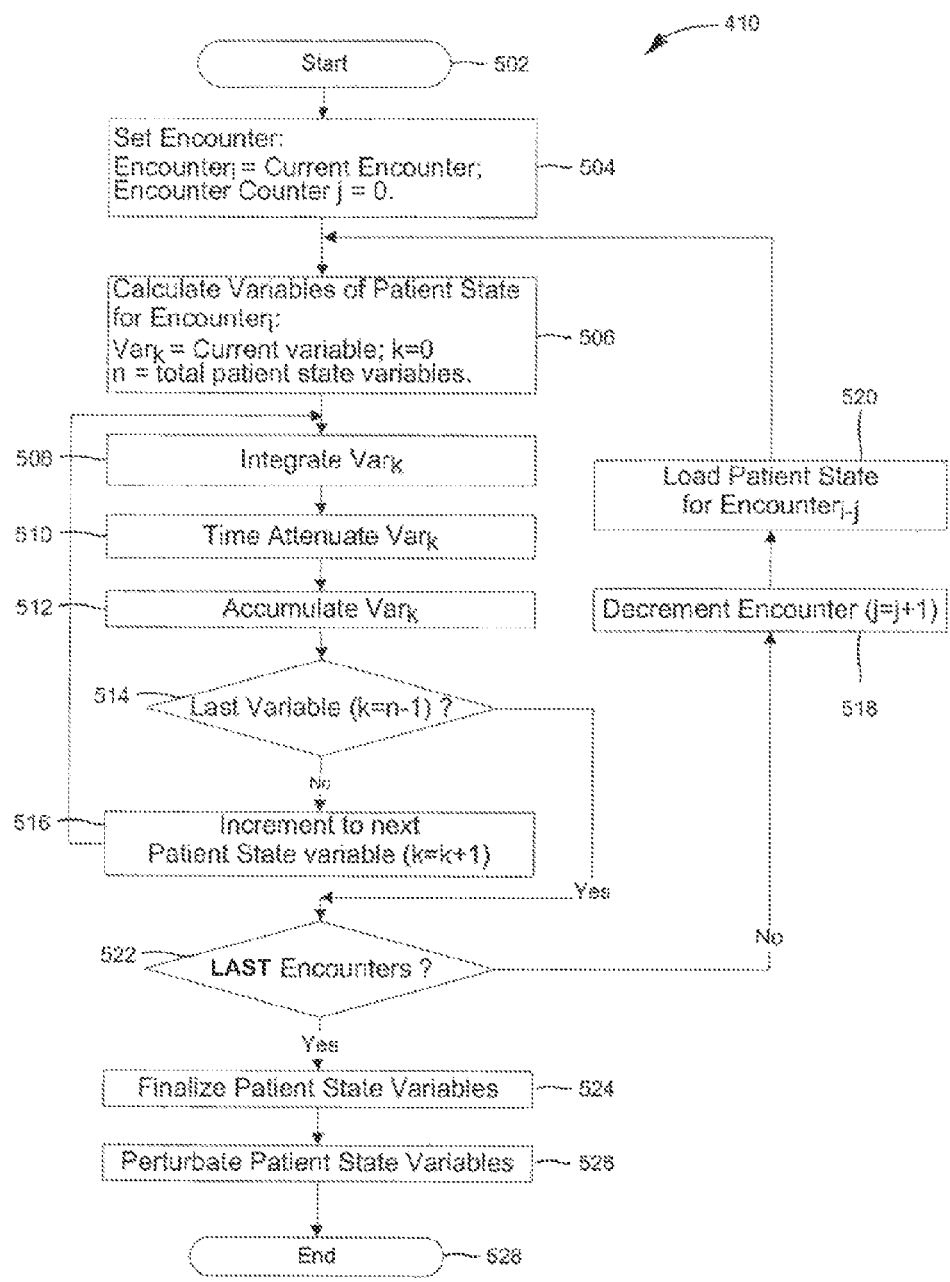
FIG. 5 is a flowchart of an example method to calculate an effect of a physician's move on a patient state for a most recent physician-patient encounter in accordance with FIGS. 1-4.

FIG. 5 is a flowchart of an example method 410 to calculate an effect of a physician's move on a patient state for a most recent physician-patient encounter in accordance with FIGS. 1-4. The flowchart 410 begins at operation 502. At operation 504, the current encounter is set (e.g., i=3). At operation 506, a current variable (e.g., $Var_k$; k=0) is set to a first variable in a set of variables for the current encounter and a total number of variables (e.g. "n") in the set is also determined. Operation 504 and 506 may be performed by the controller 148 of FIG. 1. At operation 508, the current variable $Var_k$ is integrated via integrator 152 of FIG. 1. The integrated current variable $Var_k$ is then time attenuated at operation 510 via time attenuator 154 of FIG. 1. The integrated and time attenuated current variable $Var_k$ is then accumulated at operation 512. At operation 514, it is determined whether the current variable is the last variable in the set of variables (e.g., k=n−1). If not, the current variable is incremented to the next variable (k=k+1) at operation 516 and operations 508-514 are performed for the next variable until the last variable (k=n−1) is reached at operation 514. Once all variables are integrated, time attenuated and accumulated for the current encounter, it is determined whether there other previous encounters at operation 522. If it is determined that there are other previous encounters at operation 522, the flowchart 410 continues at operation 518 at which the encounter is decremented to the next previous encounter (e.g., j=j+1) and the previous encounter is loaded at operation 520. Operations 506-522 are repeated until all encounters are processed. It is noted that at this point all variables have been integrated, time attenuated and accumulated across all patient-physician encounters, from the current encounter through to the first encounter. However, if it is determined that there are no further encounters at operation 522, all variables are finalized at operation 524 via finalizer 158 of FIG. 1, and operation 526 the variables are pertubated via pertubator 160 of FIG. 1. It should be noted that the flowchart 410 demonstrates the flow over multiple variables (126, 130, 136) in FIG. 1 as it progresses from the current encounter to the first encounter to compute the effect of each treatment move-attribute pair ($Rx_1$-$Var_1$, $Rx_j$-$Var_1$, $Rx_1$-$Var_2$, $Rx_k$-$Var_2$, $Rx_{n-1}$-$Var_m$, $Rx_n$-$Var_m$) illustrated in and described with reference to FIG. 1.

Figure 6:
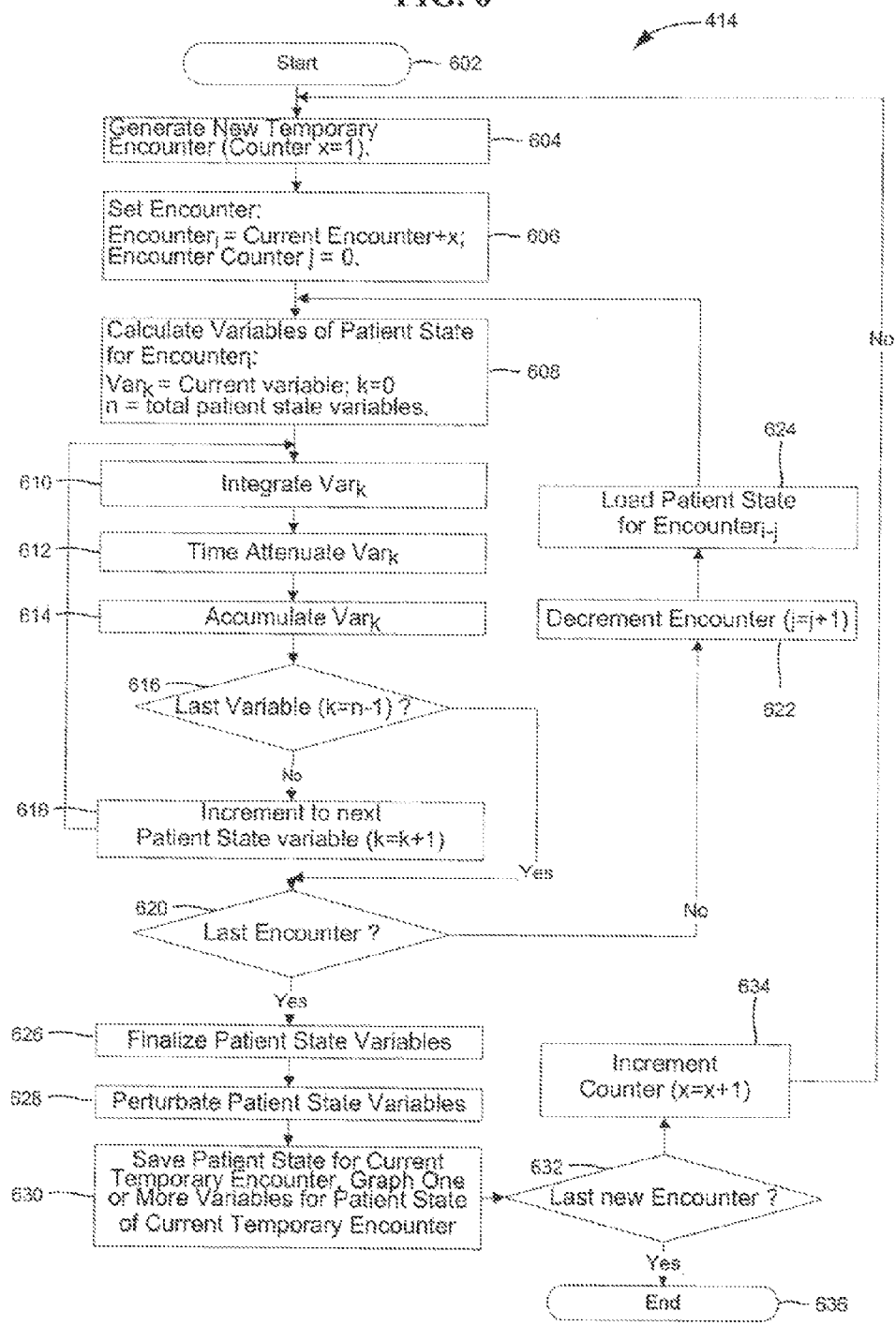
FIG. 6 is a flowchart of an example method to project one or more attributes of the patient state for a predetermined period of time in accordance with FIGS. 1-5.

FIG. 6 is a flowchart of an example method 414 to project the one or more attributes of the patient state for a predetermined period of time in accordance with FIGS. 1-5. The flowchart 410 begins at operation 602. At operation 604 a first temporary encounter is generated (e.g., counter x=1). This temporary encounter contains the same information as the most recent patient-physician encounter of FIG. 5. At operation 606, the current encounter is set to the first temporary encounter (e.g., i=3+x=1). At operation 608, a current variable (e.g., $Var_k$; k=0) is set to a first variable in a set of variables for the current encounter and a total number of variables (e.g. "n") in the set is also determined. Operation 606 and 608 may be performed by the controller 148 of FIG. 3. At operation 610, the current variable $Var_k$ is integrated via integrator 152 of FIG. 1. The integrated current variable $Var_k$ is then time attenuated at operation 612 via time attenuator 154 of FIG. 3. The integrated and time attenuated current variable $Var_k$ is then accumulated at operation 614. At operation 616, it is determined whether the current variable is the last variable in the set of variables (e.g., k=n−1). If not, the current variable is incremented to the next variable (k=k+1) at operation 618 and operations 610-616 are performed for the next variable until the last variable (k=n−1) is reached at operation 616. Once all variables are integrated, time attenuated and accumulated for the current encounter, it is determined whether there other previous encounters at operation 620. If it is determined that there are other previous encounters at operation 620, the flowchart 414 continues at operation 622 at which the encounter is decremented to the next previous encounter (e.g., j=j+1) and the previous encounter is loaded at operation 624. However, if it is determined that there are no further encounters at operation 620, all variables are finalized at operation 626 via finalizer 158 of FIG. 3, and at operation 628 the variables are pertubated via pertubator 160 of FIG. 1. At operation 630, the patient state for the current temporary encounter is saved and one or more variables of the patient state are graphed on a display via the projection module 302 and graphing module 304 of FIG. 3. At operation 632, is determined whether the current temporary encounter is the last encounter that is to be generated. As described hereinabove, temporary encounters may be generated for a projection period of 30 days, 90 days, etcetera, with each day in the period being a new temporary encounter. If the temporary encounter is the last for a projection period (e.g., 30 days), the flowchart 414 ends at operation 636. However, if the projection is to be continued, at operation 634, the temporary encounter counter is incremented (e.g., x=x+1) and the flowchart 4114 continues at operation 604 b generating a new temporary encounter having the same information as the most recent patient-physician encounter of FIG. 5.

Figure 7:
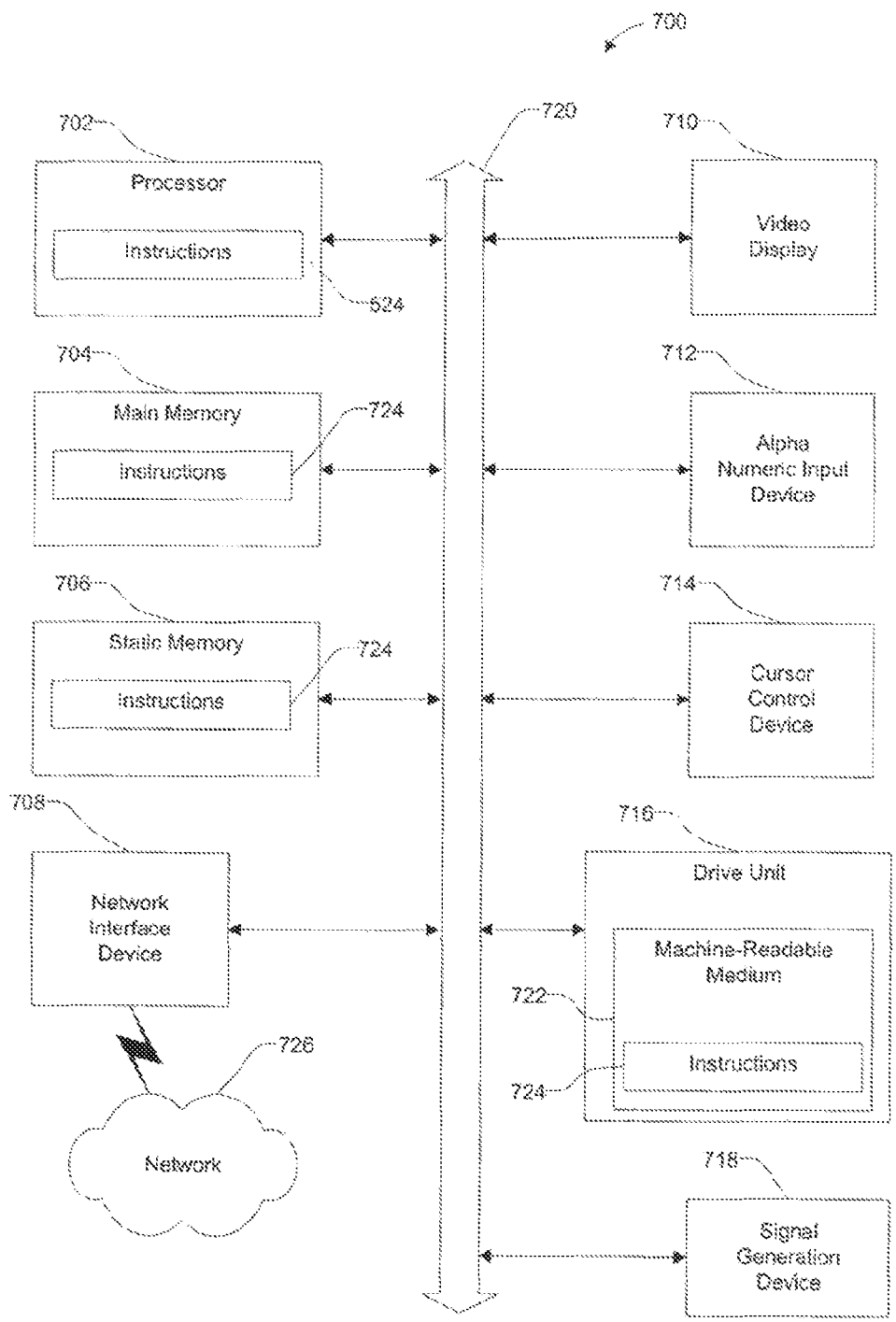
FIG. 7 is a diagrammatic representation of machine in an example form of a computer system within which a set of instructions, for causing the machine to perform any one or more of the methodologies discussed herein in FIGS. 1-6, may be executed.

FIG. 7 is a diagrammatic representation of machine in an example form of a computer system 700 within which a set of instructions, for causing the machine to perform any one or more of the methodologies discussed herein in FIGS. 1-6, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 7, the example computer system 700 includes a processor 702 (e.g., a central processing unit (CPU), a graphics processing unit (GPU) or both), a main memory 704 and a static memory 706, which communicate with each other via a bus 720. The computer system 700 may further include a video display unit 710 (e.g., a liquid crystal display (LCD) or a cathode ray tube (CRT)). The computer system 500 also includes an alphanumeric input device 712 (e.g., a keyboard), a user interface (UI) navigation device 714 (e.g., a mouse), a disk drive unit 716, a signal generation device 718 (e.g., a speaker) and a network interface device 708.

Still further with reference to FIG. 7, the disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 504 and/or within the processor 702 during execution thereof by the computer system 700, the main memory 704 and the processor 702 also constituting machine-readable media. The software 724 may further be transmitted or received over a network 726 via the network interface device 708 utilizing any one of a number of well-known transfer protocols (e.g., HTTP).

Lastly with reference to FIG. 7, while the machine-readable medium 522 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method and system for recording a video broadcast using a video recording device in accordance with scheduling changes for a scheduled recording of the video broadcast have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A computer-implemented method to determine an attribute of a simulated patient's state resulting from a patient-physician encounter, the method comprising:

storing, in the one or more computers, a plurality of patient-physician encounter records, wherein the patient-physician encounter records are associated with one or more treatment moves;

receiving, in the one or more computers, a current treatment move and an initial value of the attribute;

calculating, in the one or more computers, a current maximal expected incremental effect value of the current treatment move over a previous treatment move on the attribute to represent the maximal expected incremental effect value for a simulated future state of the patient, and displaying an indication of the future state of the patient to a user;

attenuating, in the one or more computers, the current maximal expected incremental effect value based on an amount of time between the previous treatment move and the current treatment move, wherein the amount of time is not known at the time that the maximal expected incremental effect value is determined;

summing, in the one or more computers, the attenuated current maximal expected incremental effect value with a previous maximal expected incremental effect value, as previously attenuated based on the previous treatment move and the initial value, to generate an updated attribute value of the simulated patient's state that is associated with the simulated state of the patient at the time of the current move, wherein the time of the current move is earlier than the time of the future state; and generating, in the one or more computers, a patient-physician encounter that includes the updated attribute value;

wherein the summing iteratively updates the updated attribute value based on successive current maximal expected incremental effect values as calculated in the one or more computers.

2. The method of claim 1, the calculation of the maximal expected incremental effect value further including:
computing an effect slope value from the previous treatment move to the current treatment move; and
computing an area between the previous treatment move and the current treatment move using the effect slope value.

3. The method of claim 1, further comprising pertubating the updated attribute value.

4. The method of claim 1, the receiving further including loading from a previous patient-physician encounter a patient state for the simulated patient that includes the initial value of the attribute.

5. The method of claim 1, the receiving further including inputting the current treatment move.

6. The method of claim 1, further comprising saving the patient-physician encounter that includes the updated attribute value.

7. The method of claim 1, further comprising projecting the updated attribute value for a predetermined time period.

8. The method of claim 7, wherein the projection includes
generating a temporary treatment move that includes the updated attribute value;
calculating a maximal expected incremental effect value of the temporary treatment move over the current treatment move on the updated attribute;
attenuating the maximal expected incremental effect value based on amount of time between the current treatment move and the temporary treatment move;
summing the attenuated maximal expected incremental effect value with the updated attribute value to generate a projected attribute value of the simulated patient's state; and
generating a patient-physician encounter that includes the projected attribute value; and
displaying the updated attribute value and the projected attribute value.

9. A system to determine an attribute of a simulated patient's state resulting from a patient-physician encounter, the system comprising:
A patient state and encounter database to hold data relating to current or previous patient states and data relating to a plurality of patient-physician encounters:
a user interface adapted to receive a current treatment move and to display to a user simulated states of a patient including a simulated future state;
an encounter state loader adapted to load an initial value of the attribute;
an integrator adapted to calculate a current maximal expected incremental effect value of the current treatment move over a previous treatment move on the attribute, wherein the current maximal expected incremental effect value is for the simulated future state of the patient;
a time attenuator adapted to attenuate the current determined maximal expected incremental effect value based on an amount of time between the previous treatment move and the current treatment move, wherein the amount of time is not known at the time that the maximal expected incremental effect value is determined;
a finalizer adapted to sum the attenuated currently determined maximal expected incremental effect value with a previous maximal expected incremental effect value, as previously attenuated based on the previous treatment move and the initial value, to generate an updated attribute value of the simulated patient's state; and
an updater adapted to generate a patient-physician encounter that includes the updated attribute value that is associated with the simulated state of the patient at the time of the current move, wherein the time of the current move is earlier than the time of the future state;
wherein the finalizer iteratively updates the updated attribute value based on successive current maximal expected incremental effect values as calculated in the one or more computers.

10. The system of claim 9, further comprising a pertubator adapted to pertubate the updated attribute value within a predetermined range.

11. The system of claim 9, further comprising an encounter loader adapted to load from a database a patient state for the simulated patient that includes the initial value of the attribute for a previous patient-physician encounter.

12. The system of claim 9, wherein the user interface is adapted to input the current treatment move from a user.

13. The system of claim 9, further comprising an encounter updater adapted to save the patient-physician encounter that includes the updated attribute value.

14. The system of claim 9, further comprising a projection module adapted to project the updated attribute value for a predetermined time period.

15. The system of claim 14, wherein:
the projection module includes a means for generating a temporary treatment move that includes the updated attribute value;
the integrator is further adapted to calculate a maximal expected incremental effect value of the temporary treatment move over the current treatment move on the updated attribute;
the time attenuator is further adapted to attenuate the maximal expected incremental effect value based on amount of time between the current treatment move and the temporary treatment move;
the finalizer is further adapted to sum the attenuated maximal expected incremental effect value with the updated attribute value to generate a projected attribute value of the simulated patient's state;
the updater is further adapted to generate a patient-physician encounter that includes the projected attribute value; and
a graphing module adapted to display the updated attribute value and the projected attribute value on a display device.

16. A machine accessible medium having instructions embedded thereon, the instructions when accessed by a machine perform a method to determine an attribute of a simulated patient's state resulting from a patient-physician encounter, the method comprising:
Storing, in the one or more computers, a plurality of patient-physician encounter records, wherein the patient-physician encounter records are associated with one or more treatment moves;
receiving a current treatment move and an initial value of the attribute;
calculating a current maximal expected incremental effect value of the current treatment move over a previous treatment move on the attribute to represent the maximal expected incremental effect value for a simulated future state of the patient, and displaying an indication of the future state of the patient to a user;

attenuating the current maximal expected incremental effect value based on amount of time between the previous treatment move and the current treatment move, wherein the amount of time is not known at the time that the maximal expected incremental effect value is determined;

summing the attenuated current maximal expected incremental effect value with a previous maximal expected incremental effect value, as previously attenuated based on the previous treatment move and the initial value, to generate an updated attribute value of the simulated patient's state that is associated with the simulated state of the patient at the time of the current move, wherein the time of the current move is earlier than the time of the future state; and generating a patient-physician encounter that includes the updated attribute value;

wherein the summing iteratively updates the updated attribute value based on successive current maximal expected incremental effect values as calculated in the one or more computers.

17. The medium of claim 16, the calculation of the maximal expected incremental effect value further including:

computing an effect slope value from the previous treatment move to the current treatment move; and computing an area between the previous treatment move and the current treatment move using the effect slope value.

18. The medium of claim 16, further comprising pertubating the updated attribute value.

19. The medium of claim 16, the receiving further including loading from a previous patient-physician encounter a patient state for the simulated patient that includes the initial value of the attribute.

20. The medium of claim 16, the receiving further including inputting the current treatment move.

21. The medium of claim 16, further comprising saving the patient-physician encounter that includes the updated attribute value.

22. The medium of claim 16, further comprising projecting the updated attribute value for a predetermined time period.

23. The medium of claim 22, wherein the projection includes generating a temporary treatment move that includes the updated attribute value;

calculating a maximal expected incremental effect value of the temporary treatment move over the current treatment move on the updated attribute;

attenuating the maximal expected incremental effect value based on amount of time between the current treatment move and the temporary treatment move;

summing the attenuated maximal expected incremental effect value with the updated attribute value to generate a projected attribute value of the simulated patient's state; and generating a patient-physician encounter that includes the projected attribute value; and displaying the updated attribute value and the projected attribute value.

* * * * *

UNITED STATES PATENT AND TRADEMARK OFFICE
CERTIFICATE OF CORRECTION

PATENT NO. : 8,388,348 B2
APPLICATION NO. : 11/607435
DATED : March 5, 2013
INVENTOR(S) : Biltz et al.

It is certified that error appears in the above-identified patent and that said Letters Patent is hereby corrected as shown below:

On the title page, in column 2, under "Other Publications", line 3, delete "mailed" and insert --filed--, therefor On the title page, in column 2, under "(57) Abstract", line 9, After "on", insert --an--, therefor In the Drawings On Sheet 2 of 8, Fig. 2A, reference numeral 200a, delete "Var2" and insert --$Var_2$--, therefor On sheet 2 of 8, Fig. 2A, reference numeral 200a, delete "Rx2" and insert --$Rx_2$--, therefor On sheet 2 of 8, Fig. 2A, reference numeral 200a, delete "Var3" and insert --$Var_3$--, therefor On sheet 6 of 8, Fig. 5, reference numeral 526, delete "Perturbate" and insert --Pertubate--, therefor On sheet 7 of 8, Fig. 6, reference numeral 628, delete "Perturbate" and insert --Pertubate--, therefor In the Specifications In column 1, line 3, after "2006", delete "now abandoned", therefor In column 2, line 24, delete "an" and insert --a--, therefor In column 6, line 64, delete "$Rx_m$" and insert --$Var_m$--, therefor In column 7, line 39, delete "128" and insert --138--, therefor Signed and Sealed this
Third Day of December, 2013

Margaret A. Focarino
*Commissioner for Patents of the United States Patent and Trademark Office*

CERTIFICATE OF CORRECTION (continued)
U.S. Pat. No. 8,388,348 B2

In column 8, line 8, delete "128" and insert --148--, therefor

In column 8, line 45, delete "(Var 126)" and insert --(Var$_1$ 126)--, therefor

In column 8, line 47, delete "Rx" and insert --Rx$_1$--, therefor

In column 10, line 46, delete "204=(1" and insert --204 (1--, therefor

In column 10, line 48, delete "Glipizde" and insert --Glipizide--, therefor

In column 10, line 55, delete "Rx$_3$210" and insert --Rx$_3$ 210--, therefor

In column 10, line 66, delete "2.A." and insert --2A.--, therefor

In column 12, line 9, After "where", delete "n is", therefor

In column 14, line 58, delete "4114" and insert --414--, therefor

In column 14, line 58, delete "b" and insert --by--, therefor

In column 15, line 22, delete "500" and insert --700--, therefor

In column 15, line 33, delete "504" and insert --704--, therefor

In column 15, line 41, delete "522" and insert --722--, therefor

In the Claims

In column 17, line 37, in Claim 8, after "on", insert --an--, therefor

In column 17, line 50, in Claim 9, delete "A" and insert --a--, therefor

In column 18, line 42, in Claim 15, after "on", insert --an--, therefor

In column 19, line 6, in Claim 16, after "on", insert --an--, therefor

In column 20, line 22, in Claim 23, after "on", insert --an--, therefor